(12) United States Patent
Wang

(10) Patent No.: US 7,782,128 B2
(45) Date of Patent: Aug. 24, 2010

(54) SIGN DETECTION DEVICE AND ASSOCIATED METHOD

(75) Inventor: Fucheng Wang, San Jose, CA (US)

(73) Assignee: Mstar Semiconductor, Inc., Hsinchu hsien (*) Notice: Subject to any disclaimer, the term of this patent is extended or adjusted under 35 U.S.C. 154(b) by 601 days.

(21) Appl. No.: 11/828,553

(22) Filed: Jul. 26, 2007

(65) Prior Publication Data

US 2008/0024660 A1    Jan. 31, 2008

Related U.S. Application Data

(60) Provisional application No. 60/820,608, filed on Jul. 28, 2006.

(51) Int. Cl.
G01R 19/00 (2006.01)
G01R 19/165 (2006.01)
H04L 27/22 (2006.01)

(52) U.S. Cl. .......................... 329/304; 327/28
(58) Field of Classification Search ......... 329/304–310; 327/28–30
See application file for complete search history.

(56) References Cited

U.S. PATENT DOCUMENTS

| | | | |
|---|---|---|---|
| 3,716,780 A * | 2/1973 | Van Elk et al ............. 375/254 |
| 6,032,028 A * | 2/2000 | Dickey et al. ............. 455/110 |
| 6,665,351 B2 | 12/2003 | Hedberg | |
| 6,892,060 B2 * | 5/2005 | Zheng ..................... 455/302 |
| 7,054,385 B2 | 5/2006 | Booth et al. | |
| 7,158,594 B2 | 1/2007 | Griffin et al. | |
| 7,277,516 B2 | 10/2007 | Chou et al. | |
| 2004/0208157 A1 | 10/2004 | Sander et al. | |
| 2005/0271139 A1 | 12/2005 | Ungerboeck et al. | |
| 2005/0271167 A1 | 12/2005 | Betts | |

OTHER PUBLICATIONS

Lawrence Der & Behzad Razavi, "A 2-GHz CMOS Image-Reject Receiver With LMS Calibration," IEEE Journal of Solid-State Circuits, Feb. 2003, pp. 167-175, vol. 38, No. 2.
Chun-Huat Heng, Manoj Gupta, Sang-Hoon Lee, David Kang & Bang-Sup Song, "A CMOS TV Tuner/Demodulator IC With Digital Image Rejection," IEEE Journal of Solid-State Circuits, Dec. 2005, pp. 2525-2535, vol. 40, No. 12.
Mohammad Hajirostam & Ken Martin, "On-chip Image Rejection in a Low-IF CMOS Receiver," ISSCC 2006/Session 25/ RF/IF Circuits 25.3, University of Toronto, Toronto, Canada.
Suplsa Lerstaveensin & Band-SUP Song, "A Complex Image Rejection Circuit with Sign Detection Only," ISSCC 2006/Session 25/ RF/IF Circuits 25.2, University of California, San Diego, CA.

* cited by examiner

Primary Examiner—David Mis

(57) ABSTRACT

A sign detection device including a first comparing device for comparing a first input signal with a first threshold signal in a first period and a second period to generate a first output signal; a second comparing device for comparing a second input signal with a second threshold signal to generate a second output signal; a converter for optionally changing the polarity of the second output signal to obtain a third output signal; and an operator coupled to the first comparing device and the converter for performing a logic operation of the first output signal and the third output signal to obtain polarity information of the product of the first input signal and the second input signal.

19 Claims, 7 Drawing Sheets

SIGN DETECTION DEVICE AND ASSOCIATED METHOD

CROSS REFERENCE TO RELATED PATENT APPLICATION

This application is entitled to the benefit of Provisional Patent Application Ser. No. 60/820,608 filed Jul. 28, 2006.

FIELD OF THE INVENTION

The present invention relates to a sign device and associated method, and more particularly to a sign detection device for signal imbalance calibration and associated method.

BACKGROUND OF THE INVENTION

Quadrature-phase signals I/Q have been commonly applied to wireless transceivers. It can be realized by either a quadrature down-conversion mixer or a polyphase filter. In a non-zero-IF receiver architecture, I/Q signals are essential for post frequency conversion image rejection, while in a zero-IF receiver architecture, I/Q signals are required for non-coherent demodulation. Please refer to FIG. 1, in which a block diagram of a typical radio receiver is illustrated. After a radio-frequency signal RF is received via an antenna 10, the signal RF is demodulated into an in-phase signal I and a quadrature-phase signal Q by multiplying $\sin(\omega t)$ and $\cos(\omega t)$, respectively. The quadrature-phase signal Q, after being phase-delayed by 90 degrees, is added to the in-phase signal I so as to obtain an image-free intermediate frequency signal IF.

Various analog image cancellation structures have been introduced, such as Weaver image rejection mixer, Hartley image rejection mixer, and complex filter. Ideally, the gains and phases of the in-phase signal I and the quadrature-phase signal Q are conformable to each other. In other words, the amplitudes of the in-phase signal I and the quadrature-phase signal Q are supposed to be the same, and the phase difference between the in-phase signal I and the quadrature-phase signal Q is supposed to be 90 degrees so that the image is completely rejected. In practice, however, a perfect balance between the in-phase signal I and quadrature-phase signal Q does not occur. There is generally difference existing between the amplitudes of the in-phase signal I and the quadrature-phase signal Q, and the phase difference between the in-phase signal I and quadrature-phase signal Q is hardly kept at perfectly 90 degrees. As the conventional circuits mentioned above are highly sensitive to the possible imbalance between the in-phase signal I and the quadrature-phase signal Q, the achievable rejection ratio has been limited 30 to 35 dB. The following equation describes the relation between an image rejection ratio (IRR) and gain/phase mismatches of I/Q signals:

$$IRR(dB) = -10\log\left(\frac{(\Delta A/A)^2 + \theta^2}{4}\right)$$

where $\Delta A/A$ is defined as relative gain mismatch and $\theta$ is the phase mismatch. The result is plotted in FIG. 2.

In many radio receivers, a 30-dB IRR is insufficient to fulfill the system performance requirement. For example, a 60-dB IRR is required for terrestrial TV receiver due to a conceivable scenario that the image channel interference can be 40 dB higher than the desired channel signal. From FIG. 2, it is seen that to attain 60 dB IRR, the gain and phase mismatch must be kept below 0.01 dB and 0.1 degree, respectively, which is unlikely to be achieved repetitively in analog domain without any calibration circuits.

In consequence, several correction techniques have been developed for compensating the imbalance, which are listed below and incorporated herein for reference:

[1] L. Der and B. Razavi, "A 2 GHz CMOS Image-Rejection Receiver with LMS Calibration," IEEE J. of Solid-State Circuits, Vol. 38, pp. 167-175, February 2003;

[2] C. Heng et. al., "A CMOS TV Tuner/Demodulator IC with Digital Image Rejection," IEEE J. OF Solid-State Circuits, Vol. 40, No. 12, pp. 2525-2535, December 2005;

[3] S. Lerstaveesin and B. Song, "A Complex Image Rejection Circuit with Sign Detection Only," ISSCC Technical Digest, Session 25.2, 2006;

[4] M. Hajirostam and K. Martin, "On-chip Image Rejection in a Low-IF CMOS Receiver," ISSCC Technical Digest, Session 25.3, 2006;

[5] G. M. Desjardins, "Adaptive Digital Signal Processing Algorithms for Image-Rejection Mixer Self-Calibration," UC Berkeley MS. Thesis, 2000; and

[6] I. Sever, "Adaptive Calibration Methods for an Image Rejection Mixer," UC Berkeley MS. Thesis, 2002.

SUMMARY OF THE INVENTION

The present invention provides a sign detection device and associated method for improving detection precision of gain imbalance and phase imbalance between signals so as to enhance the image rejection ratio.

The present invention discloses a sign detection device including a first comparing device for comparing a first input signal with a first threshold signal in a first period and a second period to generate a first output signal; a second comparing device for comparing a second input signal with a second threshold signal to generate a second output signal; a converter for optionally changing the polarity of the second output signal to generate a third output signal; and an operator coupled to the first comparing device and the converter for performing a logic operation for the first output signal and the third output signal to generate polarity information of the product of the first input signal and the second input signal.

Preferably, the first input signal and the first threshold signal are received by a first comparator of the first comparing device from a first input end and a second input end, respectively, in the first period, but received by the first comparing device from the second input end and the first input end, respectively, in the second period.

Preferably, the first output signal is generated and outputted at a first output end of the first comparator according to comparing results of voltages at the first input end and the second input end. The first comparing device further comprises a first controlled switch coupled between a first input terminal for receiving the first input signal and the first input end of the first comparator, a second controlled switch coupled between a second input terminal for receiving the first threshold signal and the first input end of the first comparator, a third controlled switch coupled between the second input terminal and the first input end of the first comparator, and a fourth controlled switch coupled between the first input terminal and the second input end of the first comparator, the first and second controlled switches are conducted in the first period for allowing the first input end and the second input end to receive the first input signal and the first threshold signal, respectively, and the third and fourth controlled switches are conducted in the second period for allowing the first input end and the second input end to receive the first threshold signal and the first input signal, respectively.

Preferably, voltages of the second input signal and the second threshold signal are received and compared by a second comparator of the second comparing device so as to output the second output signal from a second output end of the second comparator. The converter is coupled to the second output end of the second comparator and includes a fifth controlled switch conducted in the first period for directly outputting the second output signal as the third output signal to the operator in the first period; an inverter coupled to the second comparator for inverting the second output signal, and disposed in parallel to the fifth controlled switch; and a sixth controlled switch coupled to the inverter and conducted in the second period for outputting the inverted second output signal as the third output signal to the operator in the second period.

The present invention further discloses a sign detection method including steps of: generating a first output signal by detecting the polarity of a first input signal in a first period and the polarity of the inverted signal of the first input signal in a second period; generating a second output signal by detecting the polarity of the second input signal; receiving the second output signal to generate a third output signal by outputting the second output signal in the first period and outputting the inverted signal of the second output signal in the second period; and generating polarity information of the product of the first input signal and the second input signal by operating the first output signal and the third output signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
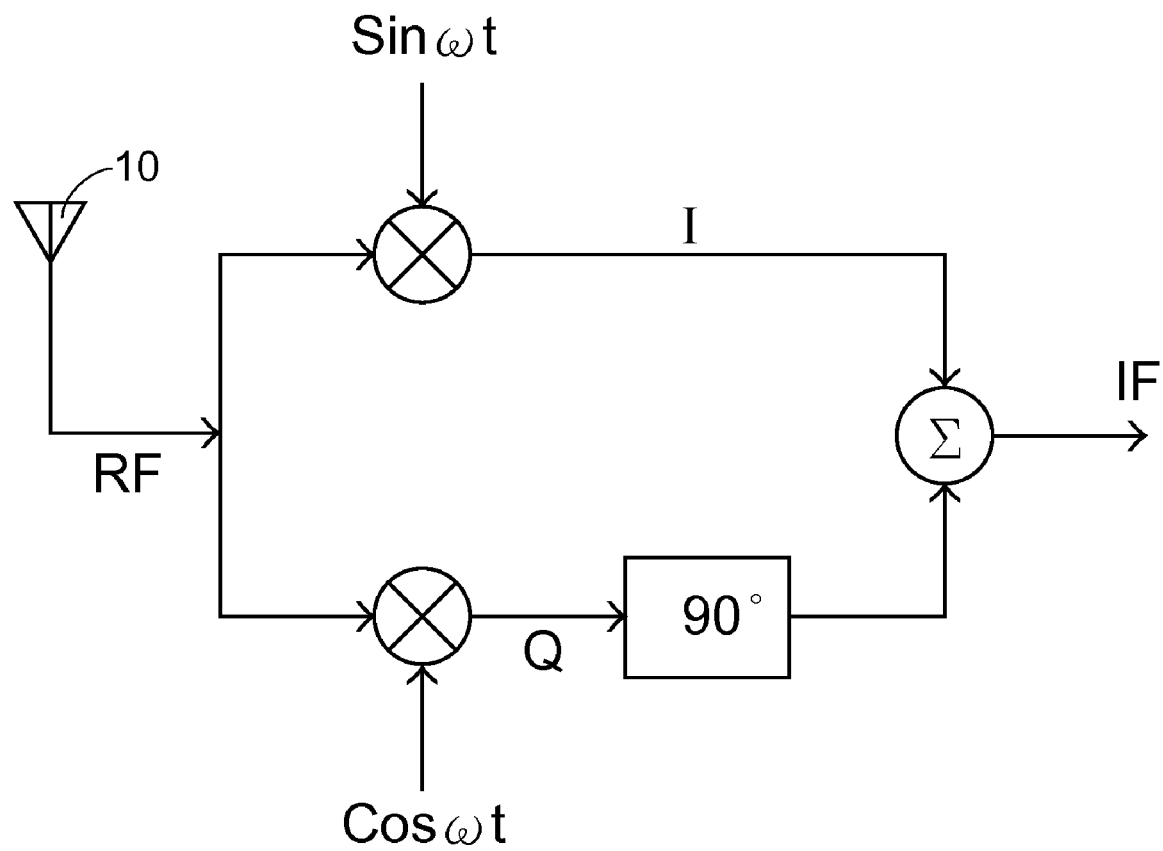
FIG. 1 is a circuit diagram illustrating a typical radio receiver.
Figure 2:
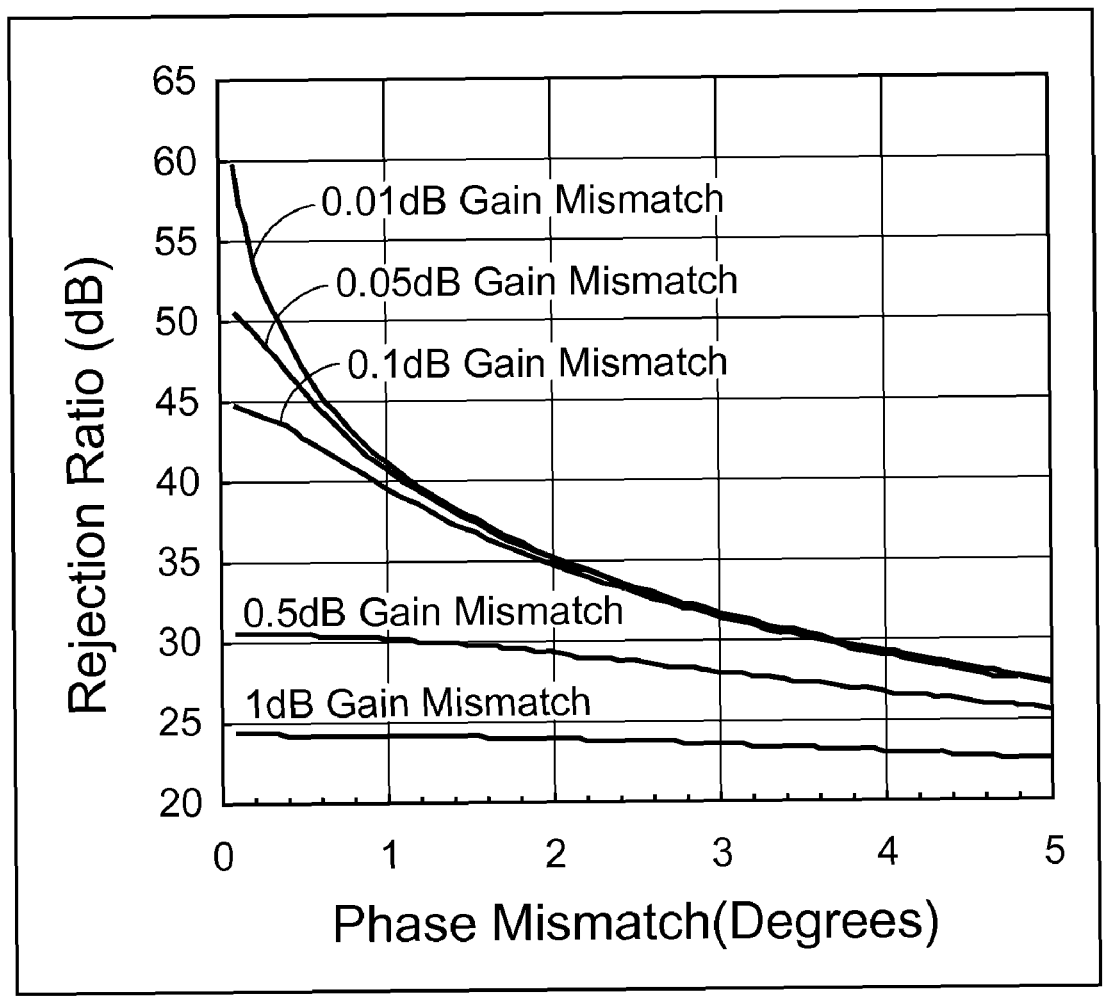
FIG. 2 is a plot showing the relation between an image rejection ratio (IRR) and gain/phase mismatches of I/Q signals.
Figure 3:
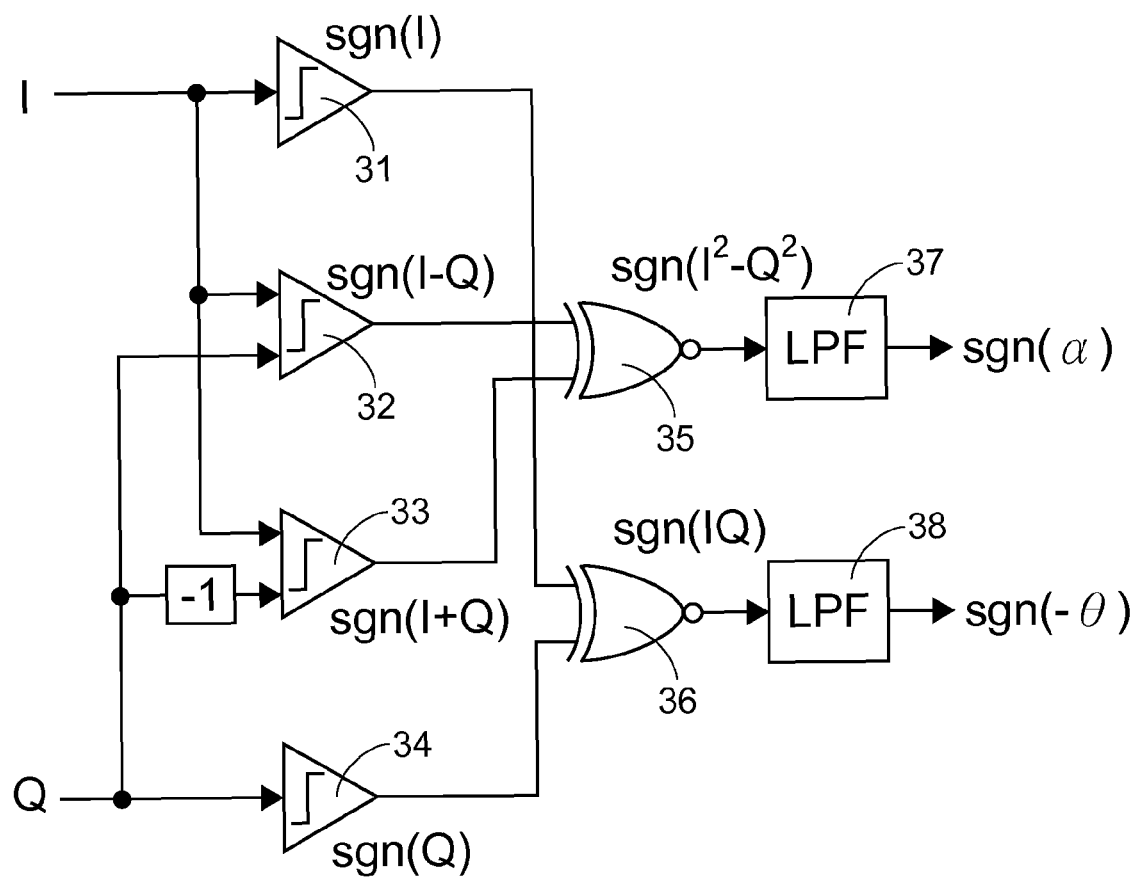
FIG. 3 is a circuit diagram illustrating an I/Q imbalance calibration device according to prior art.

To compensate analog I/Q signal imbalance, several calibration techniques have been proposed. One of the examples will be described hereinafter with reference to the circuit diagram of FIG. 3.

Assuming I/Q has a gain mismatch of $\alpha$ (<<1) and phase mismatch of $\theta$ (<<1), the I/Q signals can be represented by $I=(1+\alpha)\cos(\omega t+\theta)$ $Q=\sin(\omega t)$ Examine the product of I and Q:

$$I \cdot Q = (1 + \alpha)\cos(\omega t + \theta) \cdot \sin(\omega t)$$
$$= (1 + \alpha)(\cos(\omega t)\cos(\theta) - \sin(\omega t)\sin(\theta)) \cdot \sin(\omega t)$$
$$= (1 + \alpha)\cos(\omega t)\sin(\omega t) - \theta\sin^2(\omega t)$$
$$= (1 + \alpha)\cos(\omega t)\sin(\omega t) - \theta\left(\frac{1 - \cos(2\omega t)}{2}\right)$$
$$= (1 + \alpha)\frac{\sin(2\omega t)}{2} - \frac{\theta}{2}(1 - \cos(2\omega t))$$

It is seen that the I/Q product consists of a DC term and two oscillation terms, where the DC term is proportional to I/Q phase mismatch $\theta$. Therefore, the I/Q phase mismatch $\theta$ can be calibrated by referencing to the polarity of the I/Q product.

Similarly, by examining the term of $(I^2-Q^2)$, i.e., $$I^2 - Q^2 = (I + Q) \cdot (I - Q)$$
$$= [(1 + \alpha)\cos(\omega t + \theta)]^2 - \sin^2(\omega t)$$
$$= (1 + 2\alpha + \alpha^2)\cos^2(\omega t + \theta) - \sin^2(\omega t)$$
$$= (1 + 2\alpha + \alpha^2)(\cos(\omega t) - \theta\sin(\omega t))^2 - \sin^2(\omega t)$$
$$= (1 + 2\alpha + \alpha^2)(\cos^2(\omega t) - 2\theta\cos(\omega t) + \theta^2\sin^2(\omega t)) - \sin(\omega t)$$
$$\cong (1 + 2\alpha)(\cos^2(\omega t) - 2\theta\cos(\omega t)) - \sin^2(\omega t)$$
$$\cong \cos^2(\omega t) - \sin^2(\omega t) + 2\alpha\cos^2(\omega t)$$
$$= \cos(2\omega t) + \alpha(1 + \cos(2\omega t))$$
$$= (1 + \alpha)\cos(2\omega t) + \alpha$$

It is seen that the $(I^2-Q^2)$ term consists of a DC term and one oscillation term, where the DC term is proportional to I/Q amplitude mismatch. Therefore, the I/Q gain mismatch $\alpha$ can be calibrated by referencing to the polarity of the I/Q squared difference.

The essence of sign detection for I/Q imbalance calibration lies in that by detecting the polarity of mismatch, the imbalance can be trimmed down successively through a feedback DAC (digital-to-analog converter). Please refer to FIG. 3. The signals I and Q enter four analog comparators 31, 32, 33 and 34 to detect polarities sgn(I), sgn(Q), sgn(I−Q) and sgn(I+Q) of signals I, Q, I−Q and I+Q, respectively. Being processed by exclusive NOR gates 35 and 36 and low-pass filters 37 and 38, polarities sgn($I^2-Q^2$) and sgn(I×Q) of signals $I^2-Q^2$ and I×Q are detected. Accordingly, how the signals I and Q should be calibrated can be determined. Gains and phases of the signals I and Q can be adjusted through a DAC (not shown), thereby effectively ameliorating imbalance between the signals I and Q.

In view of the above equations, it can be noted that one sample of sign detection is insufficient to determine the polarity of mismatch due to the interference of oscillation terms. To precisely determine the polarity of mismatch, it is required to accumulate a sizable number of sign detection samples. The required amount of samples depends on the calibration resolution. While the impact of oscillation terms in sign detection can be alleviated by accumulating more samples, the effect of analog comparator offset remains as a problem which could cause errors in sign detection. Simulations show that for 100 $mV_{rms}$ I/Q signals with 1% amplitude mismatch, even with only 0.3 mV comparator offset, the polarity of amplitude mismatch could not be correctly determined. Moreover, for a typical analog comparator without applying any offset compensation technique, the offset level is on the order of 10 mV, which could significantly affect the I/Q imbalance calibration accuracy and limit the calibration resolution.

A comparator offset cancellation technique for I/Q imbalance calibration with analog sign detection is proposed to solve the above problems. Please refer to FIG. 4, which illustrates a sign detection device 40 according to an embodiment of the present invention for detecting the polarity (or sign) of the product of a first signal and a second signal. The sign detection device includes a first comparing device 5, a second comparing device 6 and a logic operator 44. The first and second signals can be an in-phase signal I and a quadrature-phase signal Q for phase mismatch detection, or a summed signal (I+Q) and a subtracted signal (I−Q) for amplitude mismatch detection.

The first comparing device 5 includes an analog comparator 41 and the second comparing device 6 includes an analog comparator 42. The comparators 41 and 42 are triggered by the rising edges of a sampling clock signal CLK to compare voltages of two input signals with respective threshold signals. According to the comparing results, two voltage differences are obtained as output signals. In an example, an in-phase signal I and a first threshold signal T1 are received from a first input terminal 111 and a second input terminal 112 to be inputted into the comparator 41 from input ends 411 and 412, respectively, to be compared. The first threshold signal T1 is preferably the differential inverted in-phase signal I⁻ of the in-phase signal I in spite a ground signal is also an option to serve as the first threshold signal T1. Accordingly, the signals inputted into the comparator 41 from input ends 411 and 412 are a differential signal pair I and I⁻. A first output signal S1 representing the polarity of the in-phase signal I can be generated and outputted from an output end 413. Likewise, a second output signal S2 representing the polarity of the quadrature-phase signal can be generated and outputted from an output end 423 by comparing another differential input signal pair Q and Q⁻, which respectively serve as the quadrature-phase signal Q and second threshold signal T2 inputted into the comparator 42 from input ends 421 and 422.

However, analog comparators have inherent offsets, so the circuitry would be affected by an offset voltage a of the comparator 41 and an offset voltage b of the comparator 42, where a and b are mutually independent and can be of either polarity. With A and B as differential signal pair inputs to the two comparators, the equivalent inputs are (A−a) and (B−b), respectively. Therefore, actually, the polarities of (A−a) and (B−b) are detected. Then, through the operation of the exclusive NOR gate 440 of the operator device 44, an output signal representing the polarity of (A−a)·(B−b) can be generated. In other words, when an in-phase signal I and a quadrature-phase signal Q are inputted into the comparators 41 and 42, respectively, the output signal represents the polarity of (I−a)·(Q−b).

In view of the following equation, all the terms except the item A·B will affect the detection accuracy:

$(A-a)\cdot(B-b)=A\cdot B-a\cdot B-b\cdot A+a\cdot b$

Figure 4:
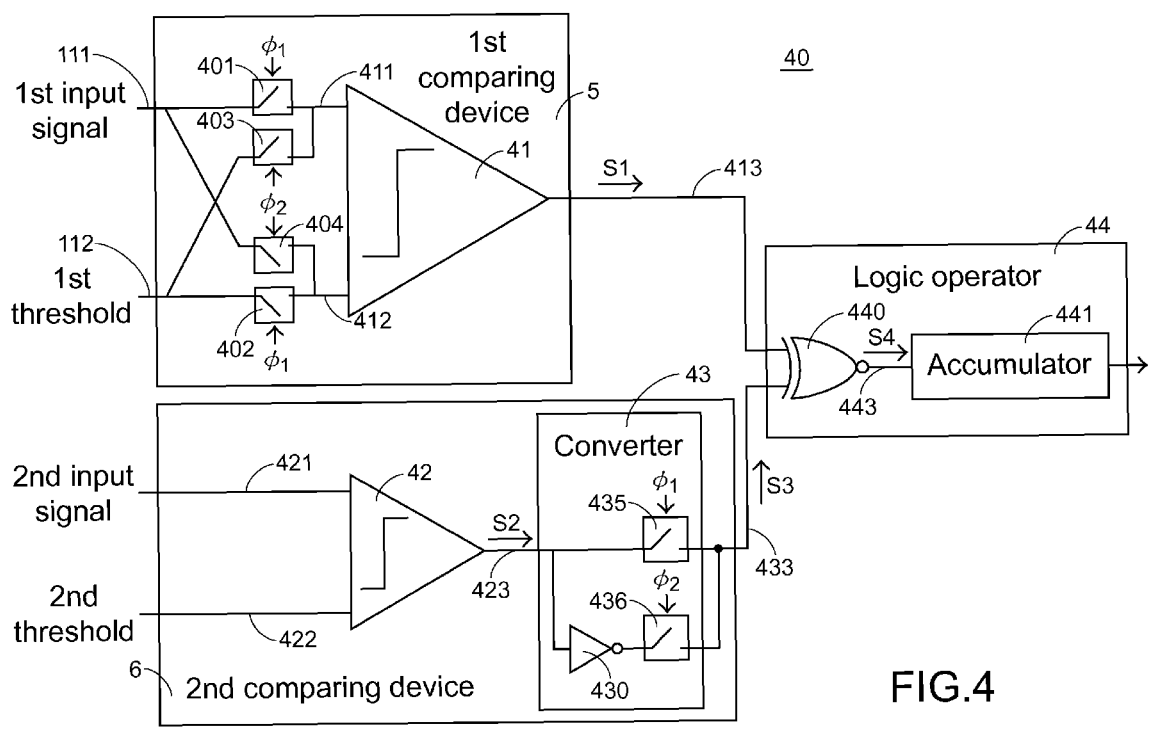
FIG. 4 is a circuit diagram illustrating a sign detection device for I/Q imbalance calibration according to an embodiment of the present invention.
Figure 5:
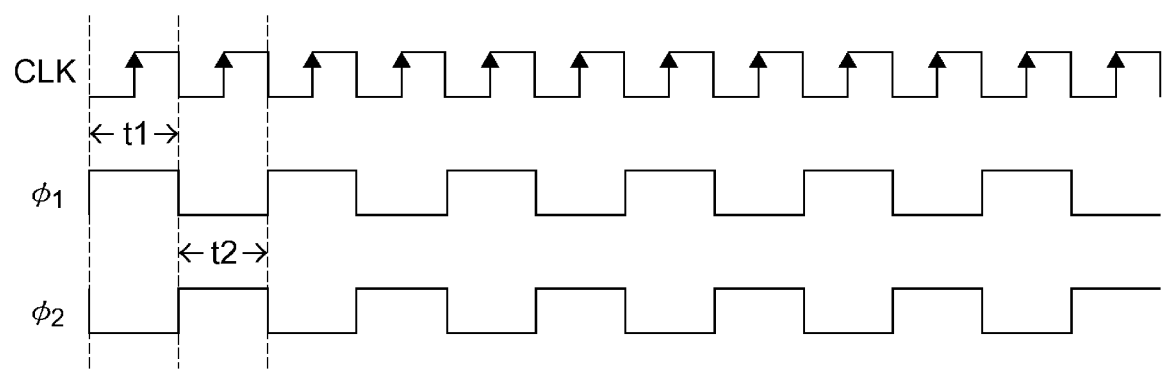
FIG. 5 shows a waveform illustrating signals for controlling switches of the sign detection device of FIG. 4.

In this embodiment, as shown in FIG. 4, a plurality of controlled switches are disposed to compensate the offset effect. Control signals $\phi_1$ and $\phi_2$ are mutually inverted and derived from CLK through a divider (not shown) of 2n (n is integer) divide ratio (n=1 in this example), as shown in FIG. 5. The high level duration of the signal $\phi_1$ is defined as a first period t1 while the high level duration of the signal $\phi_2$ is defined as a second period t2, wherein the first period t1 and second period t2 are defined by two consecutive cycles of the clock signal CLK. Alternatively, it is feasible to define the first period t1 and second period t2 in response to the clock signal CLK as the high level duration and low level duration of the same signal $\phi_1$ or $\phi_2$.

In response to the signals $\phi_1$ and $\phi_2$, the controlled switches 401 and 402 are switched ON while controlled switches 403 and 404 are switched OFF in the first period t1. The input ends 411 and 412 of the comparator 41 receive a differential signal pair of a signal A, e.g. a differential in-phase signal pair I and I⁻. The input of the first comparator 41 in the first period t1 is equivalent to a signal (I−a), and the output signal S1 represents the polarity of the signal (I−a). On the other hand, the controlled switches 403 and 404 are switched ON while the controlled switches 401 and 402 are switched OFF in the second period t2. In this case, the input into the first comparator 41 in the second period t2 is equivalent to a signal (−I−a), and the output signal S1 represents the polarity of the signal (−I−a).

In the sign detection device 40 of FIG. 4, the second comparing device 6 further includes a converter 43. The converter 43 includes an inverter 430, and controlled switches 435 and 436. At the input ends 421 and 422 of the comparator 42, a differential signal pair of a signal B, e.g. a differential quadrature-phase signal pair Q and Q⁻, is received and compared by the comparator 42 to obtain the output signal S2. In response to the signals $\phi_1$ and $\phi_2$, the output signal S2 is further processed into another output signal S3 by the converter 43. The controlled switch 435 is switched ON in the first period t1 so that the output signal S2 is directly outputted from output end 433 through the controlled switch 435 as the output signal S3. As a result, the input into the second comparator 42 in the first period t1 is equivalent to a signal (Q−b), and the output signal S3 represents the polarity of the signal (Q−b). On the other hand, the controlled switch 436 is switched ON in the second period t2 so that the output signal S2 is inverted by the inverter 430 before it is outputted through the controlled switch 436 as the output signal S3. As a result, the input into the second comparator 42 in the second period t2 is equivalent to a signal −(Q−b), and the output signal S3 represents the polarity of the signal −(Q−b).

Afterwards, after an exclusive NOR operation, an output signal S4, which represents the polarity of the signal (A−a)·(B−b) in the first period t1 while represents the polarity of the signal (−A−a)·(−(B−b)) in the second period t2, is outputted from the output end 443 of the exclusive NOR gate 440. The output signal S4 is then accumulated by an accumulator 441.

In this embodiment, with A and B as generic inputs to the two comparators, at $\phi_1$ phase, the sign detection is applied to the following equation, $(A-a)\cdot(B-b)=A\cdot B-a\cdot B-b\cdot A+a\cdot b$ While at $\phi_2$ phase, the sign detection is applied to the following equation, $(-A-a)\cdot(-(B-b))=A\cdot B+a\cdot B-b\cdot A-a\cdot b$ It is seen that at regularly alternating clock phase $\phi_1$ and $\phi_2$, the main signal term A·B for sign detection remains unaffected, while the DC term a·b resulting from comparator offset flips its polarity in each every CLK cycle. Through long-term accumulation, the DC term a·b is averaged out. As a result, comparator offset cancellation is achieved. Notice that both a·B and b·A are oscillation terms. Therefore, their influence in sign detection would be insignificant after long-term accumulation.

An exclusive OR gate may also be used in lieu of the exclusive NOR gate 440 to achieve the similar purpose with proper digital processing. Furthermore, the accumulator 441 can be substituted by an integrator to operate the output signal S4.

Since the polarity of the I/Q product can be detected independently from the a·b variation according to the present invention, similar principle can be applied to the sign detection of the product of (I+Q) and (I−Q). The sign detection according to the present invention is thus well applicable to I/Q imbalance calibration.

Figure 6:
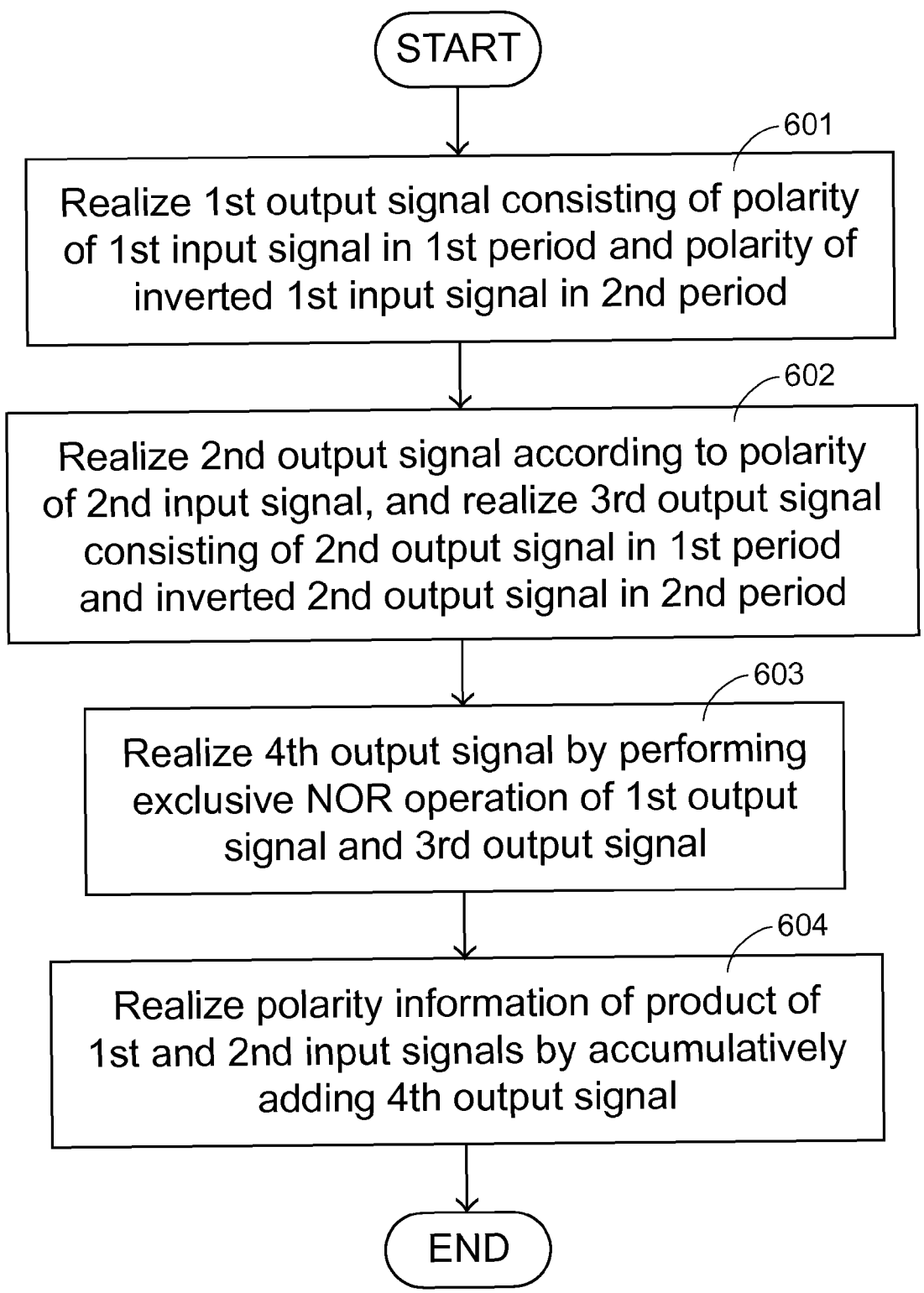
FIG. 6 is a flowchart of a sign detection method for I/Q imbalance calibration according to an embodiment of the present invention.

A sign detection method according to one embodiment of the present invention is disclosed in the flowchart of FIG. 6. The polarity of a first input signal is detected in a first period while the polarity of the inverted signal of the first input signal is detected in a second period. The detected polarities are sequentially outputted as a first output signal (Step 601). Meanwhile, the polarity of a second input signal is detected and outputted as a second output signal. Then the second output signal is directly outputted in the first period but further inverted in the second period, thereby generating a third output signal (Step 602). An exclusive NOR operation of the first output signal and the third output signal are performed to generate a fourth output signal (Step 603). The fourth output signal is then accumulated to determine polarity of the product of the first and second input signals (Step 604). When the first and second input signals are in-phase and quadrature-phase signals I and Q, the polarity of the product of the in-phase and quadrature-phase signals I and Q represents the sign of the phase mismatch value. On the other hand, when the first and second input signals are the sum (I+Q) and difference (I−Q) of in-phase and quadrature-phase signals I and Q, the polarity of the resulting product (I+Q)×(I−Q), which is indicative of the sign of the gain mismatch value, can be detected. Thus, the phase mismatch and gain mismatch can be compensated.

Figure 7:
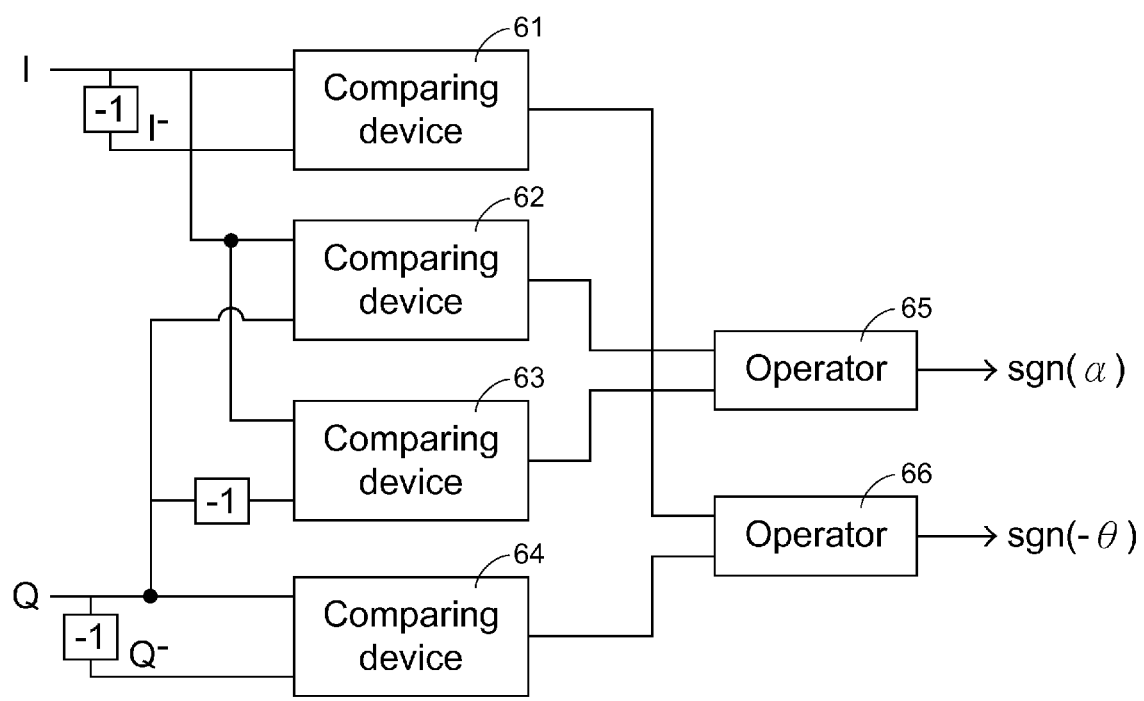
FIG. 7 is a circuit diagram illustrating an I/Q imbalance calibration device according to an embodiment of the present invention.

FIG. 7 is a functional block diagram of an I/Q imbalance calibration device with the application of the present sign detection method. In-phase signal I, differential inverted in-phase signal I⁻, quadrature-phase signal Q and differential quadrature-phase signal Q⁻ are optionally inputted into comparators 61, 62, 63 and 64 and then operated by operators 65 and 66 to detect polarities of sgn(α) and sgn(−θ) for I/Q gain mismatch α and phase mismatch θ. The comparators 61 and 62 can be the same as the comparator 5, shown in FIG. 4, the comparators 63 and 64 can be the same as the comparator 6, and the operators 65 and 66 can be the same as the operator 44.

Simulations have shown that, according to the present invention for I/Q imbalance calibration, the polarity of 0.1 degree phase mismatch and 0.2% amplitude mismatch can still be correctly detected with 5 mV comparator offset. Thus, the image rejection ratio can be enhanced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:
1. A sign detection device, comprising:
a first comparing device for comparing a first input signal with a first threshold signal in a first period and a second period to generate a first output signal;
a second comparing device for comparing a second input signal with a second threshold signal to generate a second output signal;
a converter for optionally changing a polarity of the second output signal to generate a third output signal; and
an operator coupled to the first comparing device and the converter for performing a logic operation for the first output signal and the third output signal to generate polarity information of a product of the first input signal and the second input signal.

2. The sign detection device according to claim 1 wherein the first input signal and the first threshold signal are received by a first comparator of the first comparing device from a first input end and a second input end, respectively, in the first period, but received by the first comparing device from the second input end and the first input end, respectively, in the second period.

3. The sign detection device according to claim 2 wherein the first output signal is generated and outputted at a first output end of the first comparator according to comparing results of voltages at the first input end and the second input end.

4. The sign detection device according to claim 3 wherein the first comparing device further comprises a first controlled switch coupled between a first input terminal for receiving the first input signal and the first input end of the first comparator, a second controlled switch coupled between a second input terminal for receiving the first threshold signal and the first input end of the first comparator, a third controlled switch coupled between the second input terminal and the first input end of the first comparator, and a fourth controlled switch coupled between the first input terminal and the second input end of the first comparator, the first and second controlled switches are conducted in the first period for allowing the first input end and the second input end to receive the first input signal and the first threshold signal, respectively, and the third and fourth controlled switches are conducted in the second period for allowing the first input end and the second input end to receive the first threshold signal and the first input signal, respectively.

5. The sign detection device according to claim 1 wherein voltages of the second input signal and the second threshold signal are received and compared by a second comparator of the second comparing device so as to output the second output signal from a second output end of the second comparator, and the converter is coupled to the second output end of the second comparator and comprises:
a fifth controlled switch conducted in the first period for directly outputting the second output signal as the third output signal to the operator in the first period;
an inverter coupled to the second comparator for inverting the second output signal, and disposed in parallel to the fifth controlled switch; and
a sixth controlled switch coupled to the inverter and conducted in the second period for outputting the inverted second output signal as the third output signal to the operator in the second period.

6. The sign detection device according to claim 1 wherein the operator comprises:
an exclusive NOR gate for receiving the first output signal and the third output signal to perform an exclusive NOR operation of the first output signal and the third output signal so as to generate a fourth output signal; and
an accumulator for receiving the fourth output signal to accumulate the fourth output signal so as to obtain the polarity information of the product of the first input signal and the second input signal.

7. The sign detection device according to claim 1 wherein the first input signal and the second input signal are an in-phase signal and a quadrature-phase signal, respectively, and the first threshold signal and the second threshold signal are inverted signals of the in-phase signal and the quadrature-phase signal, respectively.

8. The sign detection device according to claim 1 wherein the first input signal and the first threshold signal are an in-phase signal and a quadrature-phase signal, and the second input signal and the second threshold signal are the in-phase signal and an inverted signal of the quadrature-phase signal, respectively.

9. The sign detection device according to claim 1 wherein the first period and the second period are defined by successive cycles of a sampling clock signal.

10. A sign detection method, comprising steps of:
   generating a first output signal by detecting a polarity of a first input signal in a first period and a polarity of an inverted signal of the first input signal in a second period;
   generating a second output signal by detecting a polarity of a second input signal;
   receiving the second output signal to generate a third output signal by outputting the second output signal in the first period and outputting an inverted signal of the second output signal in the second period; and
   generating polarity information of a product of the first input signal and the second input signal by logically operating the first output signal and the third output signal.

11. The sign detection method according to claim 10 wherein the first input signal and the second input signal are an in-phase signal and a quadrature-phase signal, respectively.

12. The sign detection method according to claim 10 wherein the first input signal is a sum of an in-phase signal and a quadrature-phase signal, and the second input signal is a difference of the in-phase signal and the quadrature-phase signal.

13. The sign detection method according to claim 10 wherein the first period and the second period are substantially of the same duration.

14. The sign detection method according to claim 10, the step of generating polarity information comprising:
   performing an exclusive NOR operation for the first output signal and the third output signal to generate a fourth output signal; and
   accumulating the fourth output signal to generate the polarity information.

15. The sign detection method according to claim 10 wherein the polarity of the first input signal is detected as a positive sign when the first input signal is greater than a first threshold signal, and a negative sign when the first input signal is smaller than the first threshold signal.

16. The sign detection method according to claim 10 wherein the polarity of the inverted signal of the first input signal is detected as a positive sign when the inverted phase of the first input signal is greater than the first threshold signal, and a negative sign when the inverted phase of the first input signal is smaller than the first threshold signal.

17. The sign detection method according to claim 10 wherein the polarity information represents a gain mismatch of the product of the first and second input signals.

18. The sign detection method according to claim 10 wherein the polarity information represents a phase mismatch of the product of the first and second input signals.

19. The sign detection method according to claim 10 further comprising a step of compensating a gain mismatch and a phase mismatch according to the polarity information.

* * * * *